United States Patent [19]
Dietzsch et al.

[11] Patent Number: 4,475,445
[45] Date of Patent: Oct. 9, 1984

[54] AIR GUIDE HOUSING FOR A HEATING OR AIR CONDITIONING DEVICE FOR MOTOR VEHICLES

[75] Inventors: Kurt Dietzsch, Leonberg-Eltingen; Hans-Dieter Oess, Stuttgart; Wolfgang Kniele, Leonberg; Joachim Zander, Frechen; Gustav Jeske, Pulheim, all of Fed. Rep. of Germany

[73] Assignee: Ford-Werke Aktiengesellschaft, Cologne, Fed. Rep. of Germany

[21] Appl. No.: 468,998

[22] Filed: Feb. 23, 1983

[30] Foreign Application Priority Data
Mar. 19, 1982 [DE] Fed. Rep. of Germany ....... 3210019

[51] Int. Cl.³ .............................................. B60H 1/26
[52] U.S. Cl. ..................................... 98/2.05; 98/2.08; 312/236
[58] Field of Search ............... 62/244, 298, 302; 98/2, 98/2.05, 2.06, 2.07, 2.08, 2.11; 165/42, 43, 78; 237/12.3 A, 12.3 B; 312/122, 236, 257 A, 257 SM, 263, 264, 301, 321; 108/901

[56] References Cited
U.S. PATENT DOCUMENTS
3,766,749 10/1973 Livesay .............................. 62/298 X FOREIGN PATENT DOCUMENTS
1534866 6/1968 France.
2362018 3/1978 France.
209411 12/1982 Japan ....................................... 98/2

Primary Examiner—Harold Joyce
Attorney, Agent, or Firm—Barnes & Thornburg

[57] ABSTRACT

A housing for a heating or air conditioning unit for a motor vehicle is provided, which housing is disposed under the windshield at the middle of the vehicle and includes portions extending adjacent the lower or passenger foot region. This housing is provided with air outlet nozzles for directing warm (or cooled) air into the passenger foot region. The housing includes two upper housing parts separated by a separation plane extending perpendicular to the vehicle travel direction and a lower foot level housing part for the air outlets at the foot level. These three separate housing parts are form fittingly assembled together by slidably interengageable housing parts. With this arrangement, the foot level housing part can be assembled with the other housing parts without the need of additional work tools and is so integrated into the complete housing assembly that, with the slidable connection of the housing parts together, the foot level housing part is also securely and rigidly assembled.

20 Claims, 8 Drawing Figures

Fig. 6
Fig. 8
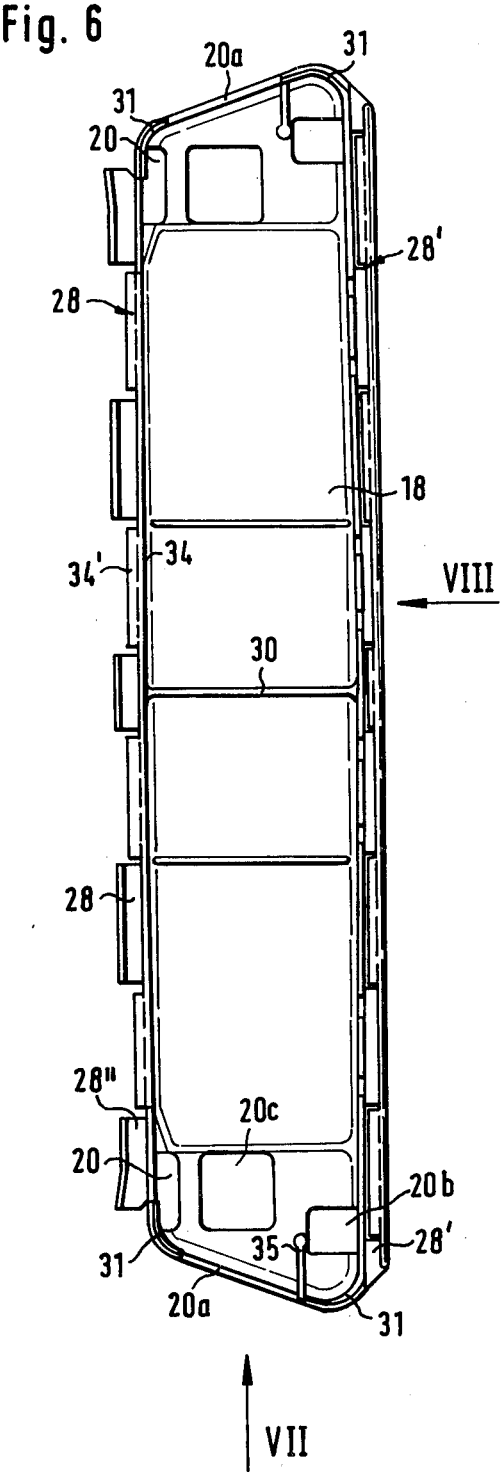
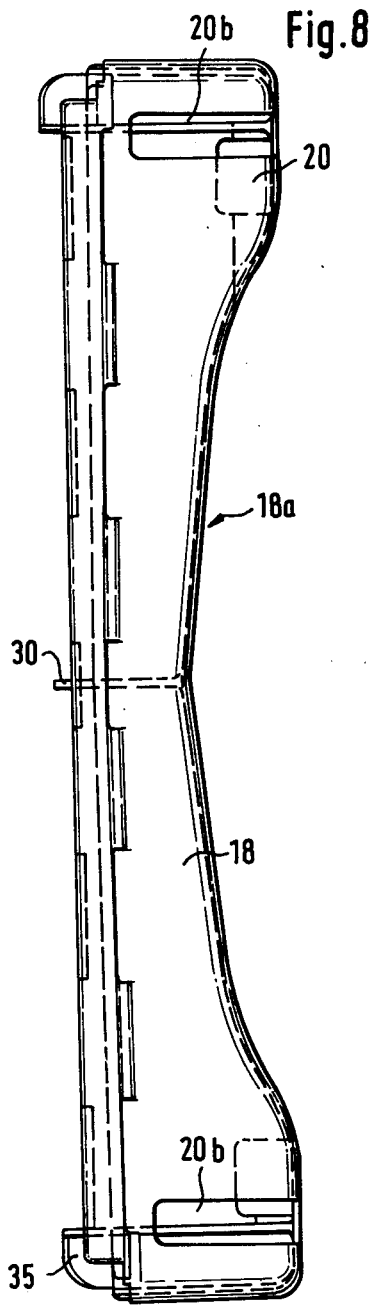

AIR GUIDE HOUSING FOR A HEATING OR AIR CONDITIONING DEVICE FOR MOTOR VEHICLES

BACKGROUND AND SUMMARY OF THE INVENTION

The invention relates to an air guide housing for a heating or air conditioning unit for motor vehicles, which housing is disposed in the driver and passenger foot region in the middle of the vehicle under the windshield and which includes controllable openings for the distribution of fresh or heated air to the region of the windshield and the passenger foot region. The invention is especially related to arrangements of this kind which include outlet nozzles and which is formed with two housing parts at opposite sides of a separation plane extending in the vehicle longitudinal direction and which includes a foot level housing part extending transverse to the separating plane and which is connected together as a separate part to the other two housing parts.

There are known heating and air conditioning devices for motor vehicles (DE-PS No. 2437232), where a housing, usually formed out of plastic material, is arranged in the region of the vehicle center tunnel (longitudinally extending centrally disposed tunnel or hump for accomodating the drive shaft and the like) and from which the fresh or heated air is selectively directed toward the windshield or the side windows, as well as to the foot space for the driver and the adjacent passenger. Known housings of this kind are configured in two parts and are connected at a transverse separating plane. In such prior arrangements, the necessary or desired heat exchange aparatus and air guide flaps and the like are selected and inserted in the housing parts for the corresponding vehicle type prior to assembly of the housing parts to form a complete air guide housing. Because of the relatively complicated form of such prior housing parts, the manufacturing costs are very large especially under the circumstances where different forms and parts are required for each different vehicle type. A further disadvantage of such prior construction is that a single part manufacture of a foot level air housing part is not feasible in part because of the required entry of work tools for undercutting to accomodate foot level side air outlets or nozzles and the like. For these reasons, there have been air guide housings proposed wherein the foot level air outlet nozzles are separate and must later be attached at the assembled housing, sometimes involving clipping on of several nozzles at corresponding housing openings and sometimes also requiring special assembly techniques, such as gluing connections. For the necessary mass production involved in the construction of motor vehicles, this kind of assembly is too expensive.

The invention of this application is based upon the provision to so construct an air guide housing of the type referred to above that no subsequent assembly work is necessary. The invention comprises forming the housing section for the foot level air nozzles as a single construction housing part which extends over both upper housing parts or halves (upperhousing parts disposed at opposite lateral sides of a longitudinally extended separation plane) which is form fitted to the respective upper housing parts by way of connecting guides extending from the separating plane at which the upper housing are interengageably connected to one another. This arrangement exhibits the great advantage that the foot level outlet nozzles are already integrated with the foot level housing parts during assembly of the housing so that, without the need for additional tools, the connection together of the two upper housing parts is done together with the secure and rigid connection of also the foot level outlet housing part. The invention is based upon the idea that, without further necessary manufacturing steps, the connection of the upper housing parts and the lower housing part can be accomplished simultaneously with a sliding together of the upper housing parts at the lower housing part. Thus the lower foot level air outlet housing part is effectively used to form slide guides extending transverse to the separating plane for the form fitting sliding connection of the upper housing parts together with one another and with the lower housing part. With a corresponding configuration of the end connections at the housing parts, the foot level air outlets are supportingly fixed in position upon the connection of the housing parts.

In particularly preferred embodiments of the invention, connection fittings are advantageously provided on the respective ends of the upper housing parts opposite the separating plane. It is possible in this manner to obtain an arrangement with closed or partly open outlet openings for the foot level air outlet housing parts in these end regions. Because of the manner of the assembly, the form of the foot level outlet nozzles and the form of the foot level housing part can be chosen independently of the outward form of the upper housing parts. This means that the cross section and the outer form of the foot level housing part can be independent of the respective design requirements of the remainder of the housing. It is for example advantageous and possible to permit the free cross section inside of the foot level outlet housing part to continuously increase toward the air outlet openings, so that a kind of "diffuser" effect results. On the other hand one can form the lower housing part in the middle of the separating plane (middle of the assembled housing) with a curved configuration with respect to the vehicle floor so that the lower housing part extends like a saddle over the region of a vehicle middle "hump" or tunnel. In that way, the necessary construction room for the air guide housing of the heater and/or air conditioner can be made smaller without however influencing the efficiency of the desired air flow in the region of the floor.

According to especially preferred embodiments, the sliding guide at the corresponding connecting walls of the upper housing parts are provided so that they extend somewhat parallel to one another and grip into corresponding sliding grooves on the upper corners of the lower foot level housing parts. The sliding guides of the housing parts can advantageously converge slightly conically toward the separating plane, which results in the advantage that during the manufacture of the upper housing parts the formation of the outward form is not hindered. Also, for the later guidance of these guides in the slots or grooves, the danger of clamping or binding of the front sides of the sliding connection is reduced. The sliding grooves at the lower housing parts can additionally be formed to diverge in a tunnel like form at the insert side, so that the already simple assembly of the upper housing parts with the lower housing parts is further simplified. Since the housing parts are held together by means of interengaging parts, the assembly of the new housing according to this invention requires no work tools.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG. 6 is a view of the lower housing part, taken in the direction of the arrow VI shown in FIG. 7;

FIG. 8 is a view of the lower housing part taken in the direction of the arrow VIII of FIG. 6.

DETAILED DESCRIPTION OF THE DRAWINGS

Figure 1:
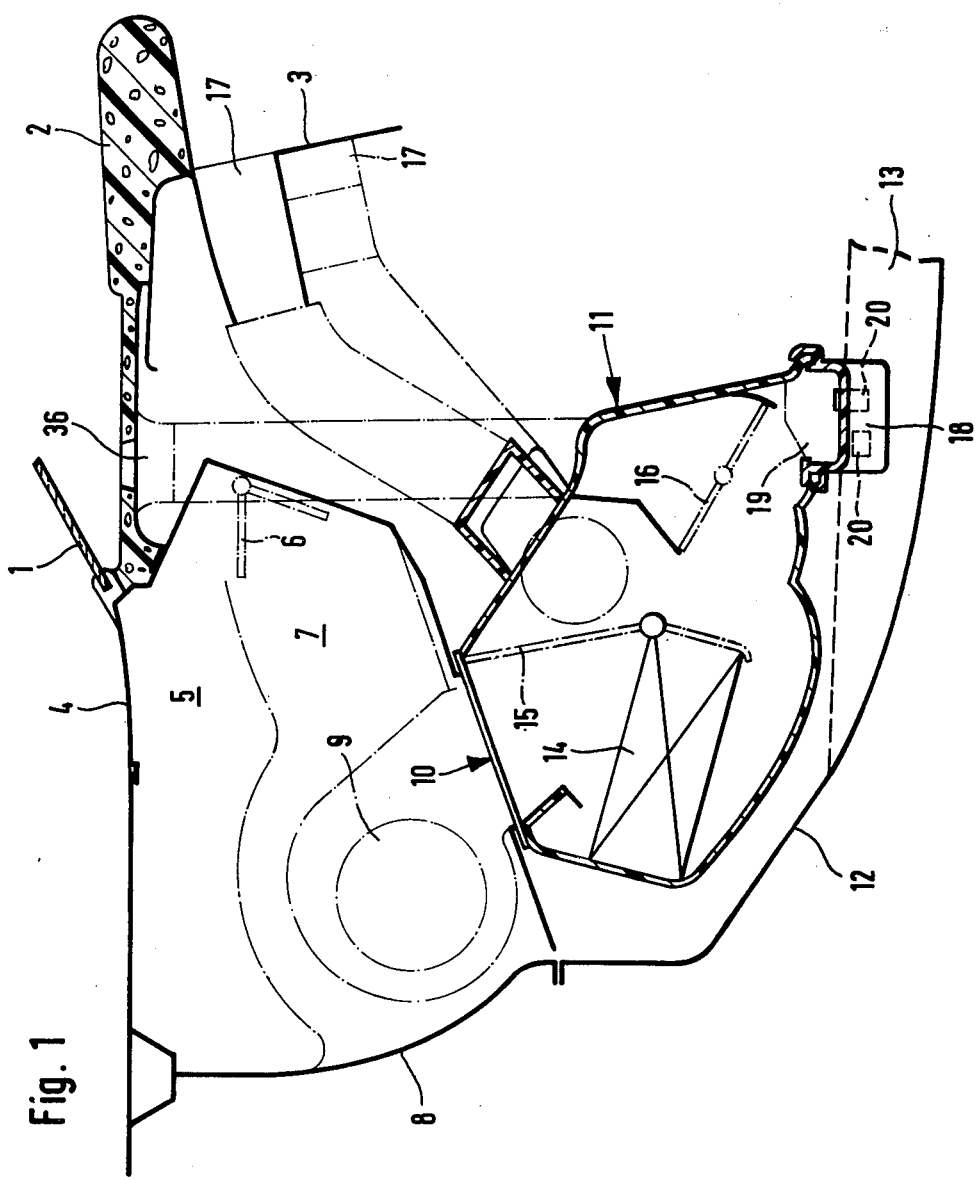
FIG. 1 is a schematic part sectional side view depicting a preferred embodiment of the novel housing construction of the present invention in position on a passenger vehicle.

FIG. 1 is a schematic cross sectional view through the longitudinal center of a passenger motor vehicle, and more particularly through the forward region of the passenger space under the windshield 1. The upholstery 2 on the dashboard is shown under the windshield 1 with the instrument panel 3 below upholstery 2. An air chamber 5 is located under the vehicle hood portion 4 forward of the windshield. Air chamber 5 can be selectively communicated with a further air chamber 7, by means of an adjustable flap 6. Chamber 7 communicates with a blower or fan 9 behind the motor separating wall 8 (fire wall 8) and from there through an opening 10 with air guide housing 11 of a heater or air conditioner for the vehicle.

Air guide housing 11 is disposed above the floor plate 12, for example in the region of the dash line illustrated drive shaft tunnel 13 of the vehicle. Housing 11 comprises an openable and closeable guide flap 15 at the entrance to a heat exchanger 14 via which either fresh or heated air is guided into the interior of the air guide housing and from there can be guided in dependence on the position of the further control flap 16 to ventilating nozzles 17 in the region of the dashboard and/or to the region of the vehicle side windows and/or to a foot level outlet housing part or channel 18 or to defroster nozzles 36. The foot level or lower housing part 18, as explained in more detail in conjunction with the other figures, is constructed as a flow channel 19 extending transversely to the longitudinal plane of the vehicle. Both lateral ends of lower housing part 18 lead to respective air outlet openings 20 of various configurations. This lower housing part 18 is therefore arranged so that the warm air or the fresh air can be brought to the foot region of the driver and the forward passenger.

Figure 2:
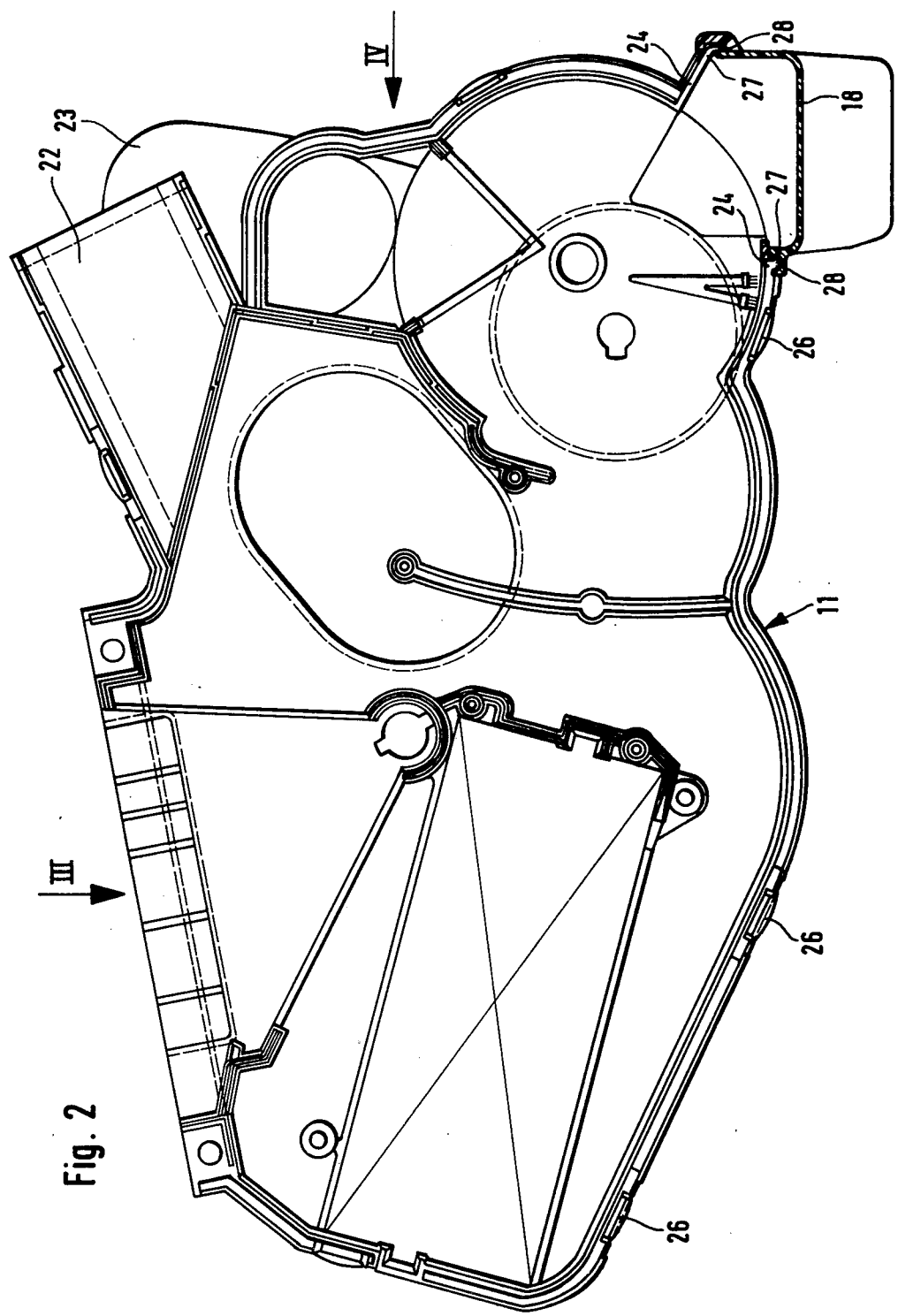
FIG. 2 is a side view of the housing of FIG. 1, showing one of the upper housing parts as seen in a direction away from the vehicle center plane, along with a sectional view of the lower housing part connected thereto.
Figure 3:
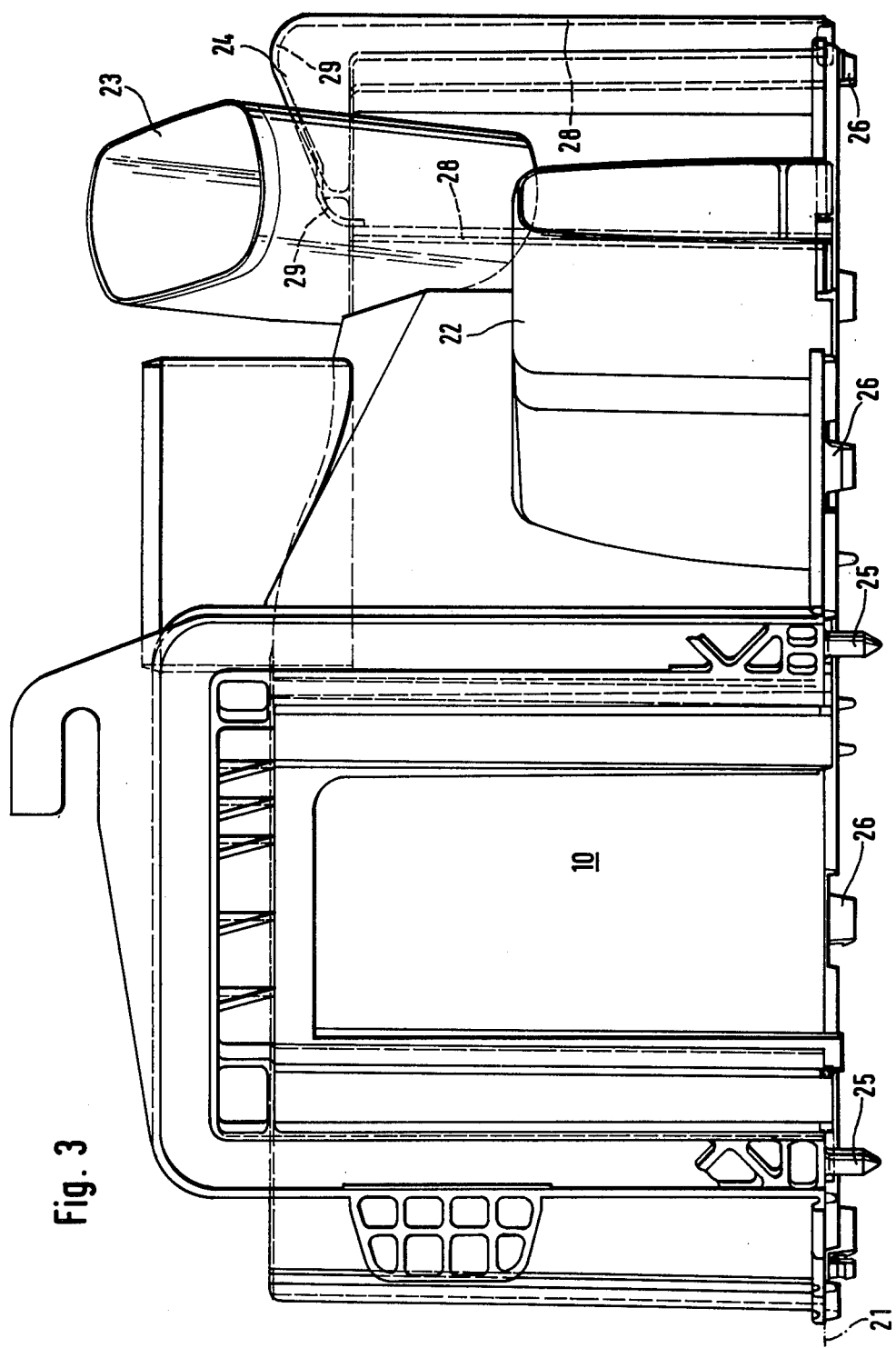
FIG. 3 is a view of the upper housing parts shown in FIG. 2, taken in the direction of arrow III of FIG. 2.
Figure 4:
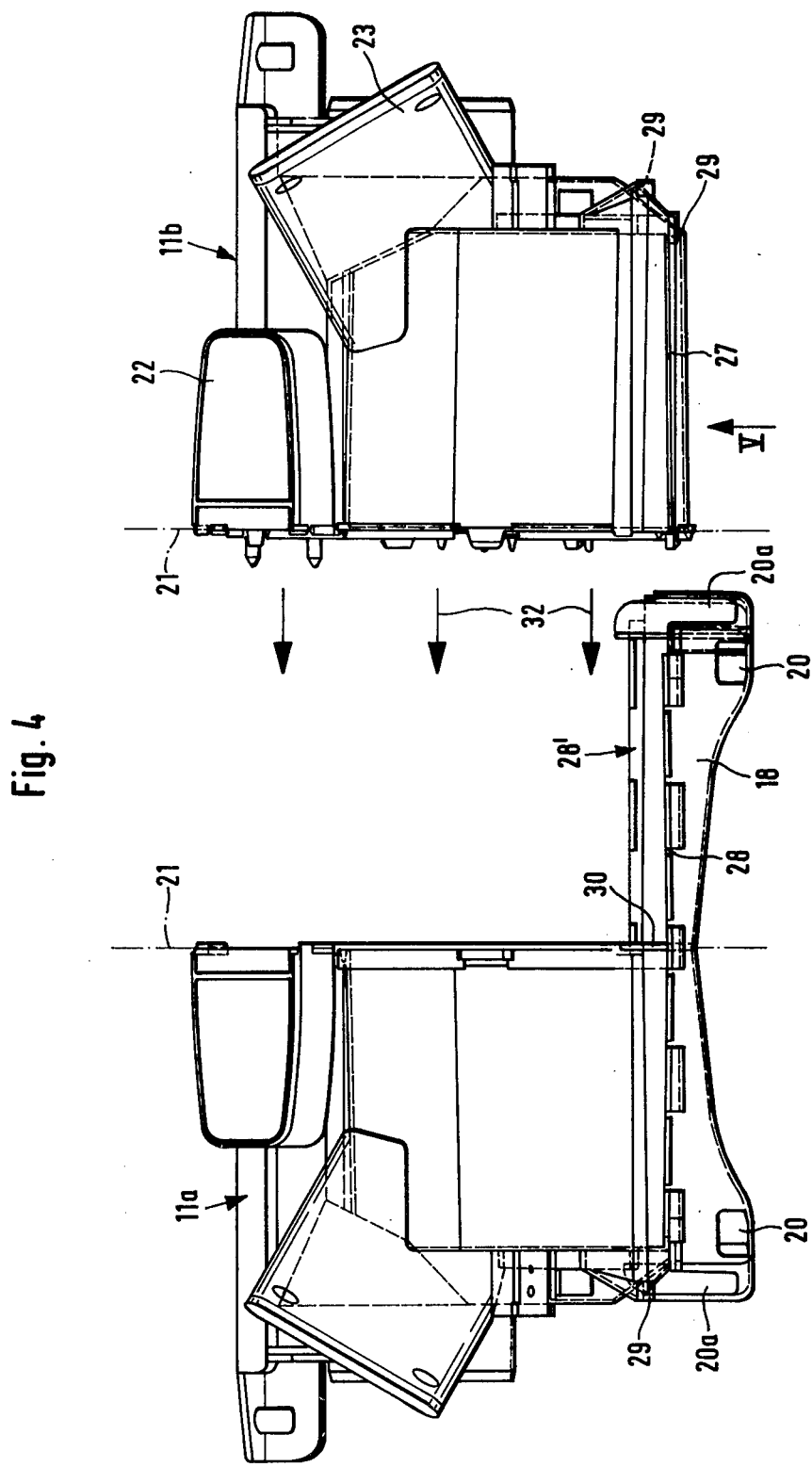
FIG. 4 is a front view of the upper housing part of FIGS. 2 and 3, taken in the direction of arrow IV of FIG. 2, along with the lower housing part slid into a partially assembled position with the other upper housing part depicted in a ready to install position.

As shown in FIGS. 2, 3, and 4, the housing 11 is made up of two upper housing halves or parts 11a and 11b which are connected together advantageously at the longitudinal middle plane of the vehicle, depicted in the drawings as separation plane 21 (FIG. 4). Both upper housing parts 11a, 11b are provided respectively with half of the inlet opening 10, with half of the connecting pipes or manifold 22 as well as with their respective connection fittings 23, leading to the side outlet nozzles.

Upper housing parts 11a, and 11b are also provided with downwardly extending connecting walls 24 at the underside of which the lower housing part 18 is supported. At the separating plane 21 (in the assembled condition) the upper housing parts 11a, and 11b are respectively provided with dowel pins 25 (part 11b) and with corresponding openings and interengageable hooks 26 (part 11a) which snap over the corresponding counter hooks upon the joining of the two upper housing parts and therefore holds the same securely along the separating plane 21. Both housing parts 11a, and 11b are made of molded plastic material, which exhibits sufficient elasticity for such a snap together assembly.

As can best be seen in FIG. 2, slide guide rails 27 are arranged at the lower edges of the connecting walls 24 of the upper housing parts 11a, and 11b which rails 27 form fittingly engage in corresponding slide grooves or slots 28 on the upper edges of the lower housing parts 18, as is further explained herein.

Figure 5:
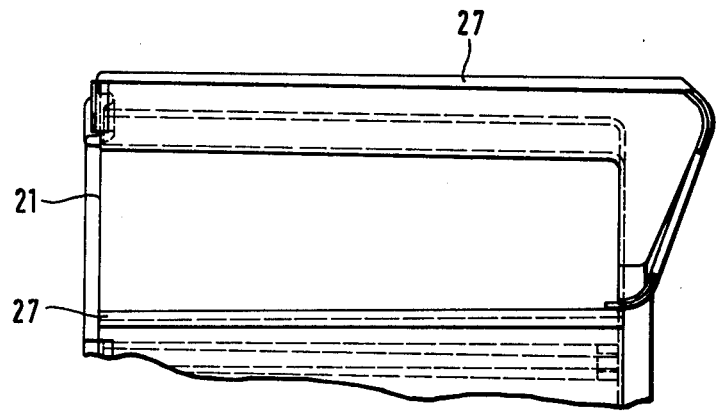
FIG. 5 is a partial view of the connection region for the lower housing part at the upper housing part.
Figure 7:
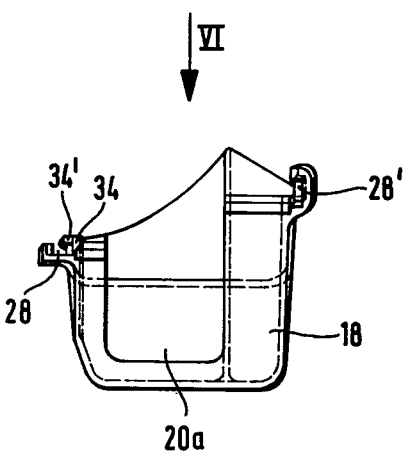
FIG. 7 is a side view of the lower housing part, taken in the direction of the arrow VII as shown in FIG. 6.

The lower housing part 18 exhibits a slightly curved outer contour, as shown in FIGS. 4 and 8, which has its highest point (narrow vertical width of part 18) disposed at the separating plane 21 after the assembly of the complete air guide housing. The lower housing part 18 can thereby extend with both of its respective lateral ends to the air outlet openings 20 in the region of the driver as well as the adjacent passenger. Both upper housing parts 11a and 11b exhibit, as also shown in FIG. 5, sliding guide rails 27 extending transverse to the separating plane 21 and substantially parallel to one another, which rails 27 are each narrowed in a slightly conical manner in the direction of the separating plane. This construction is advantageous because the outer configuration of the housing halves 11a and 11b and the formation thereof is very simple. On the other hand the sliding of these rails 27 into the corresponding grooves 28 is simplified by the slightly tapered configuration.

The ends of the sliding rails 27 opposite the separating plane 21 are provided with curved stop or connection walls 29 which (as best shown on the left side of FIG. 4) assure that each upper housing part extends only to the middle of the lower housing part 18. With this connection of the single lower housing part 18, separating wall 30 (FIGS. 6 and 8) abuts the respective upper housing parts 11a, and 11b when the stop walls 29 engage the corresponding stop wall parts 31 (FIG. 6) at the upper edge of the lower housing part 18.

As shown in FIG. 4 the upper housing part 11b is slidably shoved via rails 27 in the direction of the arrows 32 onto the grooves 28, 28' of the lower housing part 18. In this manner the upper housing parts 11a and 11b are firmly connected to one another in the separating plane 21 and the lower housing part 18 is simultaneously form fittingly secured with the two upper housing parts 11a and 11b.

According to the invention a housing for a heating or air conditioning aparatus is thus provided, which is simply constructed in a very simple manner utilizing only three parts and a single assembly procedure for fixedly connecting them together without work tools and without subsequent gluing processes being required.

It should be clear from the foregoing that the flow cross section inside of the lower housing part 18 constructed as a unitary separate housing part, can be designed independantly of the detailed configuration of the inside of the upper housing parts 11a and 11b inside of the connecting walls 24. The lower housing part 18 is therefore in the foregoing exemplary embodiment provided with a curved underside 18a so that on the inside a flow cross section results which in the region of the separating wall 30, that means in the region also of the separating plane 21, the smallest cross section is experienced and the same becomes larger in the direction of the outlet openings 20. This means that an expecially advantageous outward flow relationship at the openings 20, 20a, or 20b can be provided which facilitate an even and comfortable air distribution in the region of the driver and passenger foot space.

It is also advantageous according to preferred embodiments of the invention that the construction height of the entire housing 11 with the connected lower housing part 18 is smaller in the region of the separating plane 21 than in the outer regions, especially for installation in vehicles of the type which have a shaft tunnel extending in the longitudinal middle.

Also, with the new housing configuration of the invention, substantial freedom in the disposition of the air outlet openings at the ends of the transversely extending lower housing part 18 is obtained. The preferred embodiment illustrated shows that on the ends several outlet openings are provided which in part are arranged toward the facing side (20a) in part toward the forward side (20), in part toward the rear side (20b) and also in part downwardly (20c). It is also advantageous that through the new configuration, the openings 20a are closed from above by walls 24 of the upper housing parts because in this region, the walls serve to border the air openings as well as form the stop for the fixation of the lower housing part 18.

As also can be seen in FIG. 6, the inlet opening of at least one of the inlet grooves can be provided with a funnel widening connecting part 28" to simplify the accomodation of a corresponding sliding guide rail 27. Furthermore one can see from this FIG. 6 that the groove 28, 28" is constructed in multiple sections which are interrupted by downwardly extending sections 34' of the wall 34 of the housing part 18. These sections 34' alternate with the groove sections 28 and form gripping surfaces at the groove bottoms for the connection with the upper housing parts. In an analogous manner, grooves 28' are configured at the higher disposed side of the housing part 18. The grooves 28 and 28' can be configured to extend completely through uninterrupted, in order to provide for a better guidance stability, according to other preferred embodiments.

In the region of the outlet openings 20, 20a, 20b, 20c, part separating walls 35 can be provided as shown, extending in the insert direction 32, which walls 35 serve to apportion the air distribution through the outlet openings.

Because of the separate formation of the lower housing part 18 from the remaining housing parts, the new configuration of this invention allows a wide freedom in the selection of the form in the air guidance to the outlet openings and in the size and number of the outlet openings, without having to expect any difficulties with the manufacture of the housing or its assembly.

While we have shown and described several embodiments in accordance with the present invention, it is understood that the same is not limited thereto but is susceptible to numerous changes and modifications as would be known to those skilled in the art of the present disclosure and we therefore do not wish to be limited to the details shown and described therein but intend to cover all such changes and modifications as are encompassed by the scope of the appended claims.

We claim:

1. A housing for a heating and/or air conditioning unit of a passenger motor vehicle, comprising:
    a first housing part formed as a unitary piece and exhibiting internal air guide means for guiding air flow from a heating and/or air conditioning device to air outlet openings at a vehicle passenger space,
    a second housing part formed as a unitary piece and exhibiting internal air guide means for guiding air flow from the heating and/or air conditioning device to air outlet openings at the vehicle passenger space,
    said first and second housing parts exhibiting force fitting interengageable connecting parts for connecting said parts together,
    and a third housing part formed as a unitary piece and exhibiting internal air guide means for guiding air flow from the heating and/or air conditioning device to air outlet openings at the vehicle passenger space,
    said third housing part extending adjacent both said first and second housing parts and including slidable interengaging parts for accomodating connection of all three parts by relative sliding movements of said first and second parts on the third part.

2. A housing according to claim 1, wherein the first and second housing parts are configured as upper housing parts to be disposed in the lower region of a front vehicle passenger space at respective opposite sides of a vehicle longitudinal center plane which forms a connection plane, and wherein the third housing part is disposed below the first and second housing parts in the assembled condition of the housing, the air outlet openings of the third housing part serving to supply air to the driver and passenger foot spaces.

3. A housing according to claim 2, wherein each of said first, second and third housing parts are formed of molded plastic.

4. A housing according to claim 1, wherein guide rail means are provided at said first and second housing parts for slidably engaging corresponding guide rail guide means at the third housing part.

5. A housing according to claim 3, wherein guide rail means are provided at said first and second housing parts for slidably engaging corresponding guide rail guide means at the third housing part.

6. A housing according to claim 2, wherein guide rail means are provided at said first and second housing parts for slidably engaging corresponding guide rail guide means at the third housing part.

7. A housing according to claim 4, wherein the guide rail means extend perpendicularly to the connecting plane.

8. A housing according to claim 2, wherein the respective end regions of the first, second and third housing parts, located oppositely of the connection plane, are provided with fittings to accomodate air outlet nozzles.

9. A housing according to claim 6, wherein the guide rail means and guide rail guide means are in the form of a pair of substantially parallel guide rails on the underside of connecting wall means of the respective first and second housing parts and a corresponding pair of guide slots on the upper edges of the third housing part.

10. A housing according to claim 9, wherein the guide rails are tapered slightly to narrow in the direction of the connection plane.

11. A housing according to claim 9, wherein the guide slots are provided with respective tunnel shaped inlet openings to facilitate insertion of the guide rails.

12. A housing according to claim 10, wherein the guide slots are provided with respective tunnel shaped inlet openings to facilitate insertion of the guide rails.

13. A housing according to claim 9, wherein the respective end walls adjacent to the end of the guide slots opposite the connection plane are configured as a stop wall engageable with a corresponding stop wall section on the respective first and second housing parts to correctly position the housing parts in the assembled condition.

14. A housing according to claim 2, wherein the third housing part exhibits a central upwardly curved underside.

15. A housing according to claim 8, wherein the third housing part exhibits a central upwardly curved underside.

16. A housing according to claim 2, wherein the cross section of the third housing part decreases in the direction from the lateral outside ends.

17. A housing according to claim 2, wherein both laterally outside end regions of the third housing part exhibit air outlet openings facing in substantially all directions.

18. A housing according to claim 17, wherein stream guide walls are provided in the area of the air outlet openings of the third housing part.

19. A housing according to claim 2, wherein each of the first, second, and third housing parts is constructed of plastic material.

20. A housing according to claim 9, wherein each of the first, second, and third housing parts is constructed of plastic material.

* * * * *